(12) United States Patent
Tabata et al.

(10) Patent No.: US 8,685,524 B2
(45) Date of Patent: Apr. 1, 2014

(54) POLYLACTIC ACID-BASED RESIN SHEET

(75) Inventors: Hisataka Tabata, Otsu (JP); Taisei Matsumoto, Otsu (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 13/521,248

(22) PCT Filed: Dec. 24, 2010

(86) PCT No.: PCT/JP2010/073336
§ 371 (c)(1),
(2), (4) Date: Jul. 10, 2012

(87) PCT Pub. No.: WO2011/092989
PCT Pub. Date: Aug. 4, 2011

(65) Prior Publication Data
US 2012/0288679 A1    Nov. 15, 2012

(30) Foreign Application Priority Data

Jan. 29, 2010 (JP) .................. 2010-018290
Nov. 30, 2010 (JP) .................. 2010-266426

(51) Int. Cl.
| | | |
|---|---|---|
| B29K 33/04 | (2006.01) |
| B29K 67/00 | (2006.01) |
| B29K 105/16 | (2006.01) |
| B29K 209/00 | (2006.01) |
| B29K 209/06 | (2006.01) |
| B29K 219/00 | (2006.01) |
| B29K 409/00 | (2006.01) |
| B29K 409/06 | (2006.01) |
| B29K 421/00 | (2006.01) |
| B29K 419/00 | (2006.01) |

(52) U.S. Cl.
USPC ............ 428/147; 428/323; 428/327; 428/480

(58) Field of Classification Search
USPC ................... 428/147, 323, 327, 480
See application file for complete search history.

(56) References Cited

U.S. PATENT DOCUMENTS

2009/0074999 A1* 3/2009 Hiruma et al. ............... 428/34.9
2009/0169844 A1* 7/2009 Yamamura et al. ........... 428/213

FOREIGN PATENT DOCUMENTS

| | | |
|---|---|---|
| JP | 2006-181993 | 7/2006 |
| JP | 2006-181994 | 7/2006 |
| JP | 2006-232929 | 9/2006 |
| JP | 2006-328368 | 12/2006 |
| JP | 2007-119730 | 5/2007 |
| JP | 2008-133445 | 6/2008 |
| JP | 2009-173715 | 8/2009 |
| WO | 2007/063864 | 6/2007 |

* cited by examiner

Primary Examiner — Maria Veronica Ewald
Assistant Examiner — Joanna Pleszczynska
(74) Attorney, Agent, or Firm — DLA Piper LLP (US)

(57) ABSTRACT

A polylactic acid-based resin sheet including polylactic acid and rubber particles and characterized by satisfying (1) to (3): (1): 0.01 μm≤|Ra1−Ra2|≤0.2 μm; (2): Ra1≤0.3 μm and (3): Ra2≤0.3 μm where Ra1 is a two-dimensional center line average roughness of one surface of the sheet, and Ra2 is a two-dimensional center line average roughness of a surface other than that subjected to measurement of Ra1.

16 Claims, No Drawings

POLYLACTIC ACID-BASED RESIN SHEET

RELATED APPLICATIONS

This is a §371 of International Application No. PCT/JP2010/073336, with an international filing date of Dec. 24, 2010 (WO 2011/092989 A1, published Aug. 4, 2011), which is based on Japanese Patent Application No. 2010-018290 filed Jan. 29, 2010 and Japanese Patent Application No. 2010-266426 filed Nov. 30, 2010, the subject matter of which is incorporated herein by reference.

TECHNICAL FIELD

This disclosure relates to a polylactic acid-based resin sheet that is high in impact resistance, transparency, slipperiness, and creasability, and suitable particularly for production of moldings.

BACKGROUND

In recent years, global warming due to an increase in concentration of carbon dioxide gas in the atmosphere is becoming a global issue. Active efforts have been made in various industrial fields aiming to develop techniques for reducing the release of carbon dioxide gas into the atmosphere. In the field of plastics production, plastic products have been conventionally produced from general-purpose oil-derived input materials, and after use, their waste is processed by incineration etc., resulting in discharge of carbon dioxide gas into the atmosphere. In recent years, however, attention is focused on plastics produced from plant-derived materials, which originate in carbon (carbon dioxide gas) in the atmosphere. In particular, research and development have been actively performed towards development of practical polylactic acid-based materials, which are generally high in transparency and relatively advantageous in terms of cost as well. On the other hand, polylactic acid has a disadvantage of being low in impact resistance, and its improvement has been called for. As a method to provide polylactic acid sheets with improved impact resistance, it is known that such improvement can be achieved by adding rubber particles to polylactic acid.

Japanese Unexamined Patent Publication (Kokai) No. 2006-232929 discloses a film formed of polylactic acid-based resin containing silicone/acrylic composite rubber. Furthermore, Japanese Unexamined Patent Publication (Kokai) No. 2009-173715, Japanese Unexamined Patent Publication (Kokai) No. 2007-119730 and International Publication WO 2007/063864 disclose a resin composition, sheet or film formed of polylactic acid containing core-shell type rubber as a multi-layered structure polymer.

However, sheets and films containing rubber such as disclosed in Japanese Unexamined Patent Publication (Kokai) No. 2006-232929, Japanese Unexamined Patent Publication (Kokai) No. 2009-173715, Japanese Unexamined Patent Publication (Kokai) No. 2007-119730 and International Publication WO 2007/063864 tend to be poor in slipperiness to cause problems during molding.

Thus, it could be helpful to provide polylactic acid-based resin sheets high in impact resistance, transparency, slipperiness, and creasability and particularly suitable for production of moldings.

SUMMARY

We thus provide:

(1) A polylactic acid-based resin sheet comprising polylactic acid and rubber particles and characterized by meeting requirements 1 to 3 listed below:

$0.01\ \mu m \leq |Ra1 - Ra2| \leq 0.2\ \mu m$   Requirement 1

$Ra1 \leq 0.3\ \mu m$   Requirement 2

$Ra2 \leq 0.3\ \mu m$   Requirement 3 where

Ra1: the average roughness along the two-dimensional center line of one of the surfaces of the sheet, and Ra2: the two-dimensional center line average roughness of the surface other than that subjected to measurement of Ra1

(2) A polylactic acid-based resin sheet as defined in paragraph (1) wherein the rubber particles in a dispersed state have an average particle diameter of 0.2 μm or more and 1.0 μm or less, with a maximum particle diameter of 0.8 μm or more and 1.5 μm or less.

(3) A polylactic acid-based resin sheet as defined in either paragraph (1) or (2) wherein the rubber particles has a ratio X/Y of more than 0 and 1.0 or less, where X and Y represent the number of primary particles and that of agglomerates, respectively.

(4) A polylactic acid-based resin sheet as defined in any of paragraphs (1) to (3) that is unstretched.

(5) A polylactic acid-based resin sheet as defined in any of paragraphs (1) to (4) wherein the rubber particles are formed of a multi-layered polymer.

(6) A polylactic acid-based resin sheet as defined in any of paragraphs (1) to (5) that contains poly(meth)acrylate based resin.

(7) A polylactic acid-based resin sheet as defined in paragraph (6) wherein the poly(meth)acrylate based resin has a Vicat softening temperature of 100° C. or more.

(8) A polylactic acid-based resin sheet as defined in any of paragraphs (1) to (7) that has a layered constitution comprising a polylactic-acid-containing layer (layer A) and another polylactic-acid-containing layer (layer B) wherein layer B is at least one of the outermost layers of the sheet, and both of requirements (1) and (2) described below are met simultaneously:

$Xa < Xb$, and   requirement (1)

$Yb/Xb \geq 3$,   requirement (2)

where

Xa: the content (mass %) of rubber particles in layer A relative to that of the total components constituting layer A which accounts for 100 mass %, Xb: the content (mass %) of rubber particles in layer B relative to that of the total components constituting layer B which accounts for 100 mass %, and Yb: the content (mass %) of polylactic acid in layer B relative to that of the total components constituting layer B which accounts for 100 mass %.

(9) A polylactic acid-based resin sheet as defined in any of paragraphs (1) to (8) that has a layered constitution comprising a polylactic-acid-containing layer (layer A) and another polylactic-acid-containing layer (layer B) wherein
layer B is at least one of the outermost layers of the sheet, and
requirement (3) described below is met:

$$Za < Zb \quad \text{requirement (3)}$$

where
Za: the content (mass %) of poly(meth)acrylate based resin in layer A relative to that of the total components constituting layer A which accounts for 100 mass %, and
Zb: the content (mass %) of poly(meth)acrylate based resin in layer B relative to that of the total components constituting layer B which accounts for 100 mass %.
(10) A molded product produced from a polylactic acid-based resin sheet as defined in any of paragraphs (1) to (9).

Our polylactic acid-based resin sheet is high in impact resistance, transparency, slipperiness, and creasability, and suitable particularly for production of moldings. The use of a polylactic acid-based resin sheet makes it possible to produce a molded product with low environmental load without losing the impact resistance, transparency, and moldability possessed by the conventional petroleum-derived resin sheets. Furthermore, a preferred sheet can add heat resistance.

DETAILED DESCRIPTION

The polylactic acid-based resin sheet is described in detail below. Hereinafter, the term "sheet" refers to a two-dimensional structure such as, for instance, film and plate. The term "molded product" refers to a three-dimensional structure such as, for instance, container and printed material that is produced by processing the sheet.

It is essential for a polylactic acid-based resin sheet to contain polylactic acid and rubber particles and meet the requirements listed below:

$$0.01 \, \mu m \leq |Ra1 - Ra2| \leq 0.2 \, \mu m \quad \text{Requirement 1}$$

$$Ra1 \leq 0.3 \, \mu m \quad \text{Requirement 2}$$

$$Ra2 \leq 0.3 \, \mu m \quad \text{Requirement 3}$$

where
Ra1: the two-dimensional center line average roughness of one of the surfaces of the sheet, and
Ra2: the two-dimensional center line average roughness of the surface other than that subjected to measurement of Ra1.

Each of the requirements is described in detail below.

It is essential for the polylactic acid-based resin sheet to meet requirement 1: $0.01 \, \mu m \leq |Ra1 - Ra2| \leq 0.2 \, \mu m$. If the value of $|Ra1 - Ra2|$ is less than $0.01 \, \mu m$, sheets stacked with different surfaces in contact with each other will not slip on each other smoothly to cause feeding troubles, leading to a decrease in processing efficiency. If the value of $|Ra1 - Ra2|$ is more than $0.2 \, \mu m$, on the other hand, the sheets will slip too smoothly, and can be loosened easily after being wound in a roll. The value of $|Ra1 - Ra2|$ is preferably in the range of $0.01 \, \mu m$ or more and $0.15 \, \mu m$ or less.

Furthermore, it is essential for the polylactic acid-based resin sheet to meet requirement 2 of "$Ra1 \leq 0.3 \, \mu m$" and requirement 3 of "$Ra2 \leq 0.3 \, \mu m$". In the case of a mat-like sheet with a rough surface with at least either Ra1 or Ra2 exceeding $0.3 \, \mu m$, a molded product produced from the polylactic acid-based resin sheet may suffer from poor visibility of the contents and difficulty in fine printing. Ra1 and Ra2 are more preferably $0.2 \, \mu m$ or less. It is expected that the practically reachable values of Ra1 and Ra2 are about $0.01 \, \mu m$, and therefore, the lower limit of Ra1 and Ra2 is about $0.01 \, \mu m$.

There are no specific limitations on the method used to meet all of requirements 1 to 3 simultaneously for the polylactic acid-based resin sheet, but for instance, an effective method is to extrusion from a T-die, followed by cooling and solidification between a pair of metallic casting rolls at 5 to 50° C. The temperature of a pair of casting rolls is adjusted appropriately so that requirements 1 to 3 are met simultaneously.

The rubber particles in the polylactic acid-based resin sheet preferably has an average particle diameter in a dispersed state (dispersion diameter) of $0.2 \, \mu m$ or more and $1.0 \, \mu m$ or less, with a maximum dispersion diameter of $0.8 \, \mu m$ or more and $1.5 \, \mu m$ or less. If the average dispersion diameter is less than $0.2 \, \mu m$, it may not be possible to achieve an improvement in impact resistance which is expected by adding rubber particles. If the average dispersion diameter is more than $1.0 \, \mu m$, on the other hand, transparency may decrease. If the maximum dispersion diameter of the rubber particles is less than $0.8 \, \mu m$, furthermore, it may be necessary to add an increased amount of rubber particles to achieve an improvement in impact resistance. If the maximum dispersion diameter is more than $1.5 \, \mu m$, on the other hand, aggregates of rubber particles may be removed as foreign objects during sheet production, leading to poor appearance. To further improve the impact resistance, the average dispersion diameter of the rubber particles is more preferably $0.6 \, \mu m$ or more and $1.0 \, \mu m$ or less. The maximum dispersion diameter of the rubber particles is more preferably $1.0 \, \mu m$ or more and $1.4 \, \mu m$ or less.

The dispersion diameter of rubber particles is defined as the major axis of the rubber particles. The rubber particles subjected to measurement are supposed to contain both primary particles and agglomerates. In this major axis measurement for agglomerates, an agglomerate of particles is assumed to be one rubber particle and the major axis of the agglomerates is measured, instead of the major axis of the individual particles that constitute the agglomerates. The measuring method used for rubber particles will be described in detail later.

The average dispersion diameter of rubber particles is the average calculated from measurements of dispersion diameter. The maximum dispersion diameter of rubber particles is the largest of the dispersion diameter measurements used to calculate the average.

There are no specific limitations on the method to be used for the rubber particles in our sheet to have a dispersion diameter in the preferable range, but for instance, it can be achieved by melt-kneading polylactic acid and rubber particles and extruding them from an extruder cylinder adjusted at a temperature that is 40° C. or more higher than the melting point of the polylactic acid.

The polylactic acid-based resin sheet may be a layered sheet, in which rubber particles may be contained in only specific layers or rubber particles may be contained in all layers. In the case where the polylactic acid-based resin sheet is a layered sheet, the rubber particles in at least one of the layers containing rubber particles in the layered sheet preferably has an average dispersion diameter of $0.2 \, \mu m$ or more and $1.0 \, \mu m$ or less, with a maximum dispersion diameter of $0.8 \, \mu m$ or more and $1.5 \, \mu m$ or less. In the case of a layered sheet, it is more preferable, with a view to achieving a high impact resistance, transparency, and plant-derived content, that both of the outermost layers of the sheet contain rubber particles and that the content of rubber particles in the two outermost layers is higher than that of rubber particles in the inner layers, with the average dispersion diameter of rubber particles in each of the outermost layers being $0.2 \, \mu m$ or more and 1.0 μm or less and the maximum dispersion diameter being 0.8 μm or more and 1.5 μm or less.

It is preferable that rubber particles in a primary particle state and those in an agglomerate state coexistence in the sheet and also that the ratio X/Y of the number of primary particles (X) to that of agglomerates (Y) is more than 0 and 1.0 or less.

A "primary" particle is defined as a particle that exists independently in contact with no other particles, and the number of primary particles (X) means the number of such primary particles.

An "agglomerate," on the other hand, refers to an aggregate of two or more particles that are in contact with each other, i.e. particles in an agglomerated state, and the number of agglomerates (Y) means the number of such aggregates, each consisting of two or more particles.

For instance, if there are one rubber particle that exists independently and two agglomerates, each consisting of three rubber particles, then the number of primary particles (X) is 1 and that of agglomerates (Y) is 2.

It is more preferable that the ratio X/Y of the number of primary particles (X) to that of agglomerates (Y) is more than 0.1 and 0.5 or less. If all of the rubber particles existing in a sheet are primary particles (i.e., in the case where Y=0), the improving effect on the impact resistance will decline. If all of the rubber particles exist in the form of agglomerates (i.e., in the case where X=0), the transparency will decline. The coexistence of primary particles and agglomerates serves to produce a polylactic acid-based resin sheet that has a high impact resistance improving effect while maintaining a high transparency. If the ratio X/Y of the number of primary particles (X) to that of agglomerates (Y) is more than 1.0, this may increase the content of rubber particles necessary to have an impact resistance improving effect. In such a case, the content of polylactic acid may decrease, possibly reducing the biodegradability of the sheet.

In the case where the polylactic acid-based resin sheet is a layered sheet, rubber particles may be contained only in some specific layers or rubber particles may be contained in all layers. In the case where the polylactic acid-based resin sheet is a layered sheet, furthermore, it is preferable that in at least one of the layers that contain rubber particles in the layered sheet, rubber particles in a primary state and those in an agglomerate state coexist and also that the ratio X/Y of the number of primary particles (X) to that of agglomerates (Y) is more than 0 and 1.0 or less. In the case of a layered sheet, it is more preferable, with a view to achieving a high impact resistance, transparency, and plant-derived content, that both of the outermost layers of the sheet contain rubber particles, that the content of rubber particles in the two outermost layers is higher than that of rubber particles in the inner layers, and that rubber particles in an primary particle state and those in an agglomerate state coexist in the two outermost layers, with the ratio X/Y of the number of primary particles (X) to that of agglomerates (Y) being more than 0 and 1.0 or less.

Rubber particles are assumed to be in an agglomerate state if they are in contact with each other. There are no specific limitations on the method to be used to maintain the ratio X/Y of the number of primary particles (X) to that of agglomerates (Y) in the sheet according to the invention in the preferable range (a ratio X/Y more than 0 and 1.0 or less), but for instance, it can be achieved by melt-kneading polylactic acid and rubber particles and extruding them from an extruder cylinder adjusted at a temperature that is 40° C. or more higher than the melting point of the polylactic acid.

It is preferable that the polylactic acid-based resin sheet is an unstretched sheet. When a stretched sheet is used to produce a molded product, there will be some limitations on the method and conditions to be used, particularly in the case of producing a molded product of a three-dimensional shape by vacuum molding, vacuum air-pressure forming, or the like, leading to undesirable limitations on the range of processing conditions. If the polylactic acid-based resin sheet is an unstretched sheet, there will be a wide range of molding conditions applicable to vacuum molding and vacuum air-pressure forming, and therefore, it is preferable that the polylactic acid-based resin sheet according to the invention is an unstretched sheet.

There are no specific limitations on the rubber particles, but it is preferable that the rubber particles are formed of a multi-layered polymer. "Rubber" particles are defined as particles having a rubber component. Furthermore, a rubber component means a polymer having rubber elasticity. Details of polymers having rubber elasticity will be described later.

Monolayer rubber particles formed only of a rubber component (rubber particles having only a rubber component) may be low in adhesiveness and compatibility with polylactic acid although high in impact resistance, whereas the use of rubber particles of a multi-layered polymer composed of a shell layer that covers the rubber component layer serves to improve the adhesiveness and compatibility between rubber particles and polylactic acid. Therefore, it is preferable to use rubber particles formed of a multi-layered polymer.

A multi-layered polymer is a multi-layered structure polymer having a so-called a "core-shell" type structure that consists of an innermost layer (core layer) and one or more layers (shell layers) that cover the former, in which adjacent layers being formed of polymers of different species. There are no specific limitations on the number of layers that constitute the multi-layered polymer as long as two or more layers (one core layer and one or more shell layers) are contained, and accordingly, the polymer may consist of three or more layers (one core layer and two or more shell layers) or four or more layers (one core layer and three or more shell layers). A particularly preferable embodiment is rubber particles of a multi-layered polymer consisting of one core layer and one shell layer.

It is preferable that a multi-layered polymer contains a layer with a rubber component in addition to the outermost layers. Hereinafter, a layer with a rubber component in a multi-layered polymer is referred to as a rubber layer.

In the case where rubber particles to be used for the polylactic acid-based resin sheet is of a multi-layered polymer, there are no specific limitations on the type of the rubber layers as long as they have a polymer component with rubber elasticity. Such a polymer with rubber elasticity may be produced by polymerization of, for instance, an acrylic component, silicone component, styrene component, nitrile component, conjugated diene component, urethane component, or ethylene propylene component, and so on.

A polymer component with rubber elasticity to be used preferably as rubber component in a rubber layer is a polymer produced by polymerization of, for instance, acrylic components such as ethyl acrylate unit and butyl acrylate unit; silicone components such as dimethyl siloxane unit and phenyl methyl siloxane unit; styrene components such as styrene unit and α-methyl styrene unit; nitrile components such as acrylonitrile unit and methacrylonitrile unit; and conjugated diene components such as butadiene unit and isoprene unit. Furthermore, it is also preferable to use a polymer component with rubber elasticity produced by copolymerization of two or more of these components, such as: (1) a polymer component with rubber elasticity comprising a component produced by copolymerization of an acrylic component such as ethyl acrylate unit and butyl acrylate unit and a silicone component such as dimethyl siloxane unit and phenyl methyl siloxane unit; (2) a polymer component with rubber elasticity comprising a component produced by copolymerization of an acrylic component such as ethyl acrylate unit and butyl acrylate unit and a styrene component such as styrene unit and α-methyl styrene unit; (3) a polymer component with rubber elasticity comprising a component produced by copolymerization of an acrylic component such as ethyl acrylate unit and butyl acrylate unit and a conjugated diene component such as butadiene unit and isoprene unit; and (4) a polymer component with rubber elasticity comprising a component produced by copolymerization of an acrylic component such as ethyl acrylate unit and butyl acrylate unit, a silicone component such as dimethyl siloxane unit and phenyl methyl siloxane unit, and a styrene component such as styrene unit and α-methyl styrene unit. It is also preferable to use a polymer component with rubber elasticity produced by copolymerization involving a crosslinkable component such as divinylbenzene unit, allyl acrylate unit, and butylene glycol diacrylate unit, in addition to the above components.

For rubber particles of a multi-layered polymer, there are no specific limitations on the type of the layers other than the rubber layers as long as they comprise a polymer component that does not have rubber elasticity, but has thermoplasticity. For the rubber particles of a multi-layered polymer, examples of such a polymer component that does not have rubber elasticity, but has thermoplasticity to serve effectively as material for a layer other than the rubber layers, include polymers containing at least one selected from the group consisting of unsaturated carboxylic acid alkyl ester based unit, glycidyl-containing vinyl based unit, unsaturated dicarboxylic anhydride based unit, aliphatic vinyl based unit, aromatic vinyl based unit, vinyl cyanide based unit, maleimide based unit, unsaturated dicarboxylic acid-based unit, and other vinyl based units; of which preferable are polymers containing at least one selected from the group consisting of unsaturated carboxylic acid alkyl ester based unit, unsaturated glycidyl-containing unit, and unsaturated dicarboxylic anhydride based unit. More preferable are polymers containing at least one selected from the group consisting of unsaturated glycidyl-containing unit and unsaturated dicarboxylic anhydride based unit. It is preferable that the polymer components contained in layers other than the rubber layers has a glass transition temperature that is higher than that of the polymer components with rubber elasticity.

There are no specific limitations on the unsaturated carboxylic acid alkyl ester based unit to be used, but (meth) acrylic acid alkyl ester is preferred. Specifically, examples include methyl (meth)acrylate, ethyl (meth)acrylate, n-propyl (meth)acrylate, n-butyl (meth)acrylate, t-butyl (meth) acrylate, n-hexyl (meth)acrylate, 2-ethylhexyl (meth)acrylate, cyclohexyl (meth)acrylate, stearyl (meth)acrylate, octadecyl (meth)acrylate, phenyl (meth)acrylate, benzyl (meth)acrylate, chloromethyl (meth)acrylate, 2-chloroethyl (meth)acrylate, 2-hydroxyethyl (meth)acrylate, 3-hydroxypropyl (meth)acrylate, 2,3,4,5,6-pentahydroxyhexyl (meth) acrylate, 2,3,4,5-tetrahydroxy pentyl (meth)acrylate, aminoethyl acrylate, propyl aminoethyl acrylate, dimethylaminoethyl methacrylate, ethyl aminopropyl methacrylate, phenyl aminoethyl methacrylate, and cyclohexyl aminoethyl methacrylate. As an unsaturated carboxylic acid alkyl ester based unit, methyl (meth)acrylate is used particularly preferably because it can effectively improve the impact resistance. These units may be used singly or as a mixture of two or more thereof.

There are no specific limitations on the glycidyl-containing vinyl based unit, and examples include glycidyl (meth)acrylate, glycidyl itaconate, diglycidyl itaconate, allyl glycidyl ether, styrene-4-glycidyl ether, and 4-glycidyl styrene. As a glycidyl-containing vinyl based unit, glycidyl (meth)acrylate is used particularly preferably because it can effectively improve the impact resistance. These units may be used singly or as a mixture of two or more thereof.

Examples of the unsaturated dicarboxylic anhydride based unit include maleic anhydride, itaconic anhydride, glutaconic anhydride, citraconic anhydride, and aconitic anhydride. As an unsaturated dicarboxylic anhydride based unit, maleic anhydride is used particularly preferably because it can effectively improve the impact resistance. These units may be used singly or as a mixture of two or more thereof.

Examples of the aliphatic vinyl based unit include ethylene, propylene, and butadiene; examples of the aromatic vinyl based unit including styrene, α-methyl styrene, 1-vinyl naphthalene, 4-methyl styrene, 4-propyl styrene, 4-cyclohexyl styrene, 4-dodecyl styrene, 2-ethyl-4-benzyl styrene, 4-(phenyl butyl) styrene, and halogenated styrene; examples of said vinyl cyanide based unit including acrylonitrile, methacrylonitrile, and ethacrylonitrile; examples of said maleimide based unit including maleimide, N-methyl maleimide, N-ethyl maleimide, N-propyl maleimide, N-isopropyl maleimide, N-cyclohexyl maleimide, N-phenyl maleimide, N-(p-bromophenyl)maleimide, and N-(chlorophenyl)maleimide; examples of said unsaturated dicarboxylic acid-based unit including maleic acid, maleic acid monoethyl ester, itaconate, and phthalic acid; and examples of other vinyl based units including acrylamide, methacrylamide, N-methyl acrylamide, butoxy methyl acrylamide, N-propyl methacrylamide, N-vinyl diethyl amine, N-acetyl vinyl amine, allyl amine, ethallyl amine, N-methylallyl amine, p-aminostyrene, 2-isopropenyl-oxazoline, 2-vinyl-oxazoline, 2-acryloyl-oxazoline, and 2-styryl-oxazoline. These units may be used singly or as a mixture of two or more thereof.

For rubber particles of a multi-layered polymer, there are no specific limitations on the type of the polymer that constitutes an outermost layer, and examples include polymers containing an unsaturated carboxylic acid alkyl ester based unit, glycidyl-containing vinyl based unit, aliphatic vinyl based unit, aromatic vinyl based unit, vinyl cyanide based unit, maleimide based unit, unsaturated dicarboxylic acid-based unit, unsaturated dicarboxylic anhydride based unit, and/or other vinyl based units, of which particularly preferable are polymers containing an unsaturated carboxylic acid alkyl ester based unit, unsaturated glycidyl-containing unit, and/or unsaturated dicarboxylic anhydride unit. Still more preferable are polymers containing an unsaturated carboxylic acid alkyl ester based unit. There are no specific limitations on the unsaturated carboxylic acid alkyl ester based unit to be used, but (meth)acrylic acid alkyl ester is preferable, and methyl (meth)acrylate is more preferable.

In the case where rubber particles are of a multi-layered polymer, referable examples of the multi-layered polymer include a multi-layered polymer consisting of a core layer and a shell layer. Examples of such particles of a multi-layered polymer consisting of a core layer and a shell layer include rubber particles consisting of a core layer of a dimethyl siloxane/butyl acrylate polymer with an outermost layer of a methyl methacrylate polymer, rubber particles consisting of a core layer of a butadiene/styrene polymer with an outermost layer of a methyl methacrylate polymer, and rubber particles consisting of a core layer of a butyl acrylate polymer with an outermost layer of a methyl methacrylate polymer. Furthermore, it is more preferable that either or both of the rubber layer and the outermost layer are of a polymer containing glycidyl methacrylate units.

In the case where rubber particles are of a multi-layered polymer, there are no specific limitations on the mass content of the core layer in the entire multi-layered polymer, it is preferable that the core layer accounts for 50 mass % or more and 90 mass % or less in the entire 100 mass % of the multi-layered polymer, and it is more preferable that the core layer accounts for 60 mass % or more and 80 mass % or less.

It is preferable that the polylactic acid-based resin sheet contains a poly(meth)acrylate based resin from the viewpoint that heat resistance and moldability are excellent.

The content of a poly(meth)acrylate based resin in the entire 100 mass % of a sheet is preferably 5 mass % to 60 mass %, more preferably 5 mass % to 50 mass %, and still more preferably 5 mass % to 25 mass %. If the content of a poly (meth)acrylate based resin in the entire 100 mass % of a sheet is more than 60 mass %, the overall plant-derived content in the sheet will decrease. If the content of a poly(meth)acrylate based resin in the entire 100 mass % of a sheet is less than 5 mass %, the poly(meth)acrylate based resin contained may fail to improve the heat resistance.

The polylactic acid-based resin sheet may a layered sheet, and in the case of a layered sheet, polylactic acid-based resin may be contained only in some specific layers or polylactic acid-based resin may be contained in all layers. It is preferable that at least the outermost layers on both sides of the sheet contain poly(meth)acrylate based resin.

It is preferable that in the polylactic acid-based resin sheet, the poly(meth)acrylate based resin has a Vicat softening temperature of 100° C. or more. If the poly(meth)acrylate based resin has a Vicat softening temperature of less than 100° C., the sheet will have to contain a large amount of poly(meth) acrylate based resin to achieve a heat resistance of a practical level, leading to the problem of a decreased plant-derived content in the entire sheet. Therefore, it is preferable that in the polylactic acid-based resin sheet, the poly(meth)acrylate based resin has a Vicat softening temperature of 100° C. or more. If the poly(meth)acrylate based resin has a Vicat softening temperature of more than 140° C., its melt viscosity tends to increase, leading to deterioration in compatibility with polylactic acid. This can cause a decrease in transparency, and therefore, it is preferable that in the polylactic acid-based resin sheet, the poly(meth)acrylate based resin has a Vicat softening temperature of 140° C. ° C. or less.

It is preferable that the polylactic acid-based resin sheet has a layered constitution comprising a layer A that contains polylactic acid and a layer B that contains polylactic acid, and that layer B is at least one of the outermost layers of the sheet and meets both the following requirements (1) and (2).

$$Xa<Xb, \text{ and} \qquad \qquad \text{Requirement (1)}$$

$$Yb/Xb \geq 3. \qquad \qquad \text{Requirement (2)}$$

$Xa$: the content (mass %) of rubber particles in layer A relative to that of the total components constituting layer A which accounts for 100 mass %, $Xb$: the content (mass %) of rubber particles in layer B relative to that of the total components constituting layer B which accounts for 100 mass %, and $Yb$: the content (mass %) of polylactic acid in layer B relative to that of the total components constituting layer B which accounts for 100 mass %.

It is particularly preferable that in the polylactic acid-based resin sheet, the layer B constitutes the outermost layers on both sides of the sheet and meets both requirements (1) and (2) given above to simultaneously achieve high impact resistance, transparency, and plant-derived content.

In the polylactic acid-based resin sheet, layer A may not contain rubber particles as long as the sheet meets requirement (1), but it is preferable that layer A also contains rubber particles.

For requirement (2), it is preferable that $Yb/Xb \geq 4$, more preferably $Yb/Xb \geq 10$. If $Yb/Xb > 50$, the effect of the addition of rubber particles on improvement in impact resistance may not be achieved in some cases and, therefore, it is preferable that $Yb/Xb \leq 50$.

When both requirements (1) and (2) are met simultaneously, the polylactic acid-based resin sheet according to the invention can achieve impact resistance at a practical level while maintaining a high plant-derived content and transparency.

If $Xa$, $Xb$, and $Yb$ do not meet requirements (1) and (2), it will be difficult for the polylactic acid-based resin sheet to have a high impact resistance, transparency, and high plant-derived content simultaneously.

If $Xa \geq Xb$, for instance, a large amount of rubber particles will have to be contained to achieve an impact resistance of a practical level, or transparency will deteriorate in some cases, and the plant-derived content will also decline in some cases. If $Yb/Xb < 3$, transparency will deteriorate in some cases, and the plant-derived content will also decline in some cases.

It is preferable that the polylactic acid-based resin sheet has a layered constitution comprising a layer A that contains polylactic acid and a layer B that contains polylactic acid, and that layer B is at least one of the outermost layers of the sheet and meets the following requirement (3).

$$Za<Zb \qquad \qquad \text{Requirement (3)}$$

$Za$: the content (mass %) of poly(meth)acrylate based resin in layer A relative to that of the total components constituting layer A which accounts for 100 mass %, and $Zb$: the content (mass %) of poly(meth)acrylate based resin in layer B relative to that of the total components constituting layer B which accounts for 100 mass %.

It is particularly preferable that in the polylactic acid-based resin sheet, the layer B constitutes the outermost layers on both sides of the sheet and meets requirement (3) given above to achieve a high heat resistance and plant-derived content.

In the polylactic acid-based resin sheet, Layer A may not contain poly(meth)acrylate based resin as long as the sheet meets requirement (3), but it is preferable that layer A also contains poly(meth)acrylate based resin.

For requirement (3), it is preferable that $3Za \leq Zb$, more preferably $5Za \leq Zb$.

If $Za \geq Zb$, layer A and layer B will have to contain a large amount of poly(meth)acrylate based resin in some cases to achieve a heat resistance of a practical level, or the plant-derived content in the entire sheet can decrease.

It is preferable that the polylactic acid-based resin sheet has a haze Ha of 1% or more and 10% or less. If the Ha value is in the above range, molded products produced from such a sheet will achieve a high content visibility. Accordingly, it is possible to provide favorable products in the form of packaging containers and packaging sheets with good design characteristics including package appearance. If Ha is less than 1%, such sheets may be liable to suffer flaws, and products such as packaging containers and packaging sheets produced from them may have poor appearance. If Ha is more than 10%, on the other hand, such sheets may be liable to have poor transparency and unsuitable for practical use. It is more preferable that the polylactic acid-based resin sheet has a Ha value of 2% or more and 8% or less.

To maintain the haze Ha at 1% or more and 10% or less, the value can be controlled by using rubber particles with an appropriate refractive index, using rubber particles with an appropriate dispersion diameter in the sheet, or adding inorganic particles or organic particles as needed. More specifically, the Ha value of a polylactic acid-based resin sheet approaches 1% as the refractive index of the rubber particles is approximated to the refractive index of polylactic acid. Under the opposite conditions, the Ha value will approach 10%. The Ha value, furthermore, can be approximated to 10% by increasing the content of rubber particles.

It is preferable that the polylactic acid-based resin sheet has an impact value Im of 2.5N·m/mm or more. A polylactic acid-based resin sheet with high impact resistance can be produced by controlling the impact value Im at 2.5N·m/mm or more. It is more preferable that the impact value Im is 3.0N·m/mm or more. The higher the impact value Im of a polylactic acid-based resin sheet, the better, but a value of about 3.0N·m/mm is practically high for a sheet to serve for processing uses. If the impact value Im is less than 2.5 N·m/mm, however, burrs and cracks may occur during a stamping process, possibly leading to deterioration in processability.

It is expected that the practically reachable impact value Im is 5.5 N·m/mm or so and, therefore, the upper limit of the impact value Im may be set at about 5.5 N·m/mm.

An impact value Im of 2.5N·m/mm or more can be achieved by controlling the content of rubber particles or the dispersion diameter of rubber particles. More specifically, as an effective method, the content of rubber particles relative to that of the total components constituting the sheet, which accounts for 100 mass %, is adjusted to 2.0 mass % or more and the average dispersion diameter of rubber particles is adjusted to 0.2 μm or more and 1.0 μm or less, with the maximum dispersion diameter maintained at 0.8 μm or more and 1.5 μm or less.

It is preferable that the polylactic acid-based resin sheet has a dynamic friction coefficient μd of 0.20 or more and 0.40 or less. An μd value of less than 0.20 often leads to loose winding or meandering. If the value of μd is less than 0.40, sheets stacked with different surfaces in contact with each other will not slip on each other smoothly to cause feeding troubles, leading to a decrease in processing efficiency.

A method to achieve a dynamic friction coefficient μd of 0.20 or more and 0.40 or less is to meet the above mentioned requirement 1 (0.01 μm≤|Ra1−Ra2|≤0.2 μm) while simultaneously meeting both Ra1≤0.2 μm and Ra2≤0.2 μm.

There are no specific limitations on the method used to maintain the two-dimensional center line average roughness in the preferable range (0.01 μm≤|Ra1−Ra2|≤0.2 μm) while simultaneously meeting both Ra1≤0.2 μm and Ra2≤0.2 μm, but for instance, an effective method is to extrude material from a T-die, followed by cooling and solidification between a pair of metallic casting rolls at 25 to 50° C. The temperature of a pair of casting rolls is adjusted appropriately so that the requirements are met simultaneously.

The polylactic acid-based resin sheet is one containing polylactic acid and rubber particles. A polylactic acid consists mainly of L-lactic acid and/or D-lactic acid as primary components. A material that consists mainly of L-lactic acid and/or D-lactic acid as primary components is defined as one in which these lactic-acid-derived components account for 70 mol % or more and 100 mol % or less of the total monomer components constituting the polylactic acid material, which accounts for 100 mol %, and it is preferable to use a homo-polylactic acid material that consists virtually only of L-lactic acid and/or D-lactic acid.

It is preferable that the polylactic acid is crystalline. A crystalline polylactic acid material is defined as one that releases heat of crystal fusion attributed to polylactic acid components as determined by differential scanning calorimetry (DSC) in an appropriate temperature range after crystallizing the polylactic acid material adequately by heating. Commonly, homo-polylactic acid increases in melting point and crystallinity with an increasing optical purity. The melting point and crystallinity of polylactic acid is affected by its molecular weight and catalysts used for its polymerization, but commonly a homo-polylactic acid material with an optical purity of 98% or more has a melting point of 170° C. or so and has a relatively high crystallinity. On the other hand, the melting point and crystallinity decreases with a decreasing optical purity, and a homo-polylactic acid material with an optical purity of 88%, for instance, has a melting point of about 145° C. degree. A homo-polylactic acid material with an optical purity of 75% has a melting point of about 120° C. degree. A homo-polylactic acid material with an optical purity of less than 70% is generally non-crystalline and does not show a definite melting point.

Depending on its uses, a polylactic acid material may be a mixture of a crystalline homo-polylactic acid and an amorphous homo-polylactic acid that can develop or improve required functions. In this case, an appropriate content of the amorphous homo-polylactic acid may be taken as long as it does not impair the desired effect. To provide a sheet with relatively high heat resistance, it is preferable that the polylactic acid material to be used contains at least one polylactic acid component with an optical purity of 95% or more.

Our polylactic acid commonly has a mass average molecular weight of at least 50,000 or more, preferably 80,000 to 400,000, more preferably 100,000 to 300,000. The mass average molecular weight as referred to herein is defined as a molecular weight measured by gel permeation chromatography (GPC) using chloroform as solvent and converted in terms of polymethyl methacrylate.

The use of polylactic acid with a mass average molecular weight of at least 50,000 serves to produce a sheet containing the polylactic acid with good mechanical characteristics, and also allow processed products with good mechanical characteristics to be produced from the sheet.

The polylactic acid may be a copolymerized polylactic acid comprising an ester-forming monomer component copolymerized with L-lactic acid and/or D-lactic acid. Examples of the copolymerizable monomer component include hydroxycarboxylic acid such as glycolic acid, 3-hydroxybutyric acid, 4-hydroxybutyric acid, 4-hydroxyvaleric acid, and 6-hydroxycaproic acid; compounds containing two or more hydroxyl groups in one molecule such as ethylene glycol, propylene glycol, butanediol, neopentyl glycol, polyethylene glycol, glycerin, and pentaerythritol; derivatives thereof; compounds containing two or more carboxylic acid groups in one molecule such as succinic acid, adipic acid, sebacic acid, fumaric acid, terephthalic acid, isophthalic acid, 2,6-naphthalene dicarboxylic acid, 5-sodium sulfoisophthalic acid, and 5-tetrabutyl phosphonium sulfoisophthalic acid; and derivatives thereof. Of the copolymerization components given above, it is preferable to use a biodegradable one, depending on uses. It is preferable that these copolymerization components account for 0 mol % or more and 30 mol % or less of the total monomer components constituting the polylactic acid material, which accounts for 100 mol %.

Details will be described later, but the methods available for polylactic acid production include direct polymerization from lactic acid, and ring opening polymerization via lactide.

It is preferable that polylactic acid accounts for 85 mass % or more and 98 mass % or less of the total components constituting the polylactic acid-based resin sheet according to the invention, while rubber particles accounts for 2.0 mass % or more and 15 mass % or less of the total components constituting the sheet, which account for 100 mass %.

In cases where the polylactic acid-based resin sheet contains poly(meth)acrylate based resin, it is preferable that polylactic acid accounts for 25 mass % or more and 93 mass % or less of the total components constituting the sheet, while rubber particles accounts for 2.0 mass % or more and 20 mass % or less of the total components constituting the sheet, which account for 100 mass %. If the polylactic acid-based resin sheet contains poly(meth)acrylate based resin, the sheet can deteriorate in impact resistance, and therefore, it may be necessary to increase the content of rubber particles to maintain an impact resistance at a practical level.

The polylactic acid-based resin sheet may contain, as required, generally known various additives including antioxidant, ultraviolet ray stabilization agent, color protection agent, delustering agent, deodorant, flame retardant, weathering agent, antistatic agent, antioxidant, ion exchange agent, crystal nucleating agent, and color pigment, as well as lubricants including inorganic fine particles, organic particles other than rubber particles and other organic lubricants, unless they impair the effect of the invention. Their preferable content is 0.1 mass % or more and 2.0 mass % or less of the total components of the polylactic acid-based resin sheet, which account for 100 mass %.

Effective antioxidants include hindered phenolic ones and hindered amine based ones. Effective color pigments include inorganic pigments such as carbon black, titanium oxide, zinc oxide, and iron oxide and organic pigments such as cyanine based ones, styrene based ones, phthalocyanine based ones, anthraquinone based ones, perinone based ones, isoindolinone based ones, quinophtharone based ones, quinacridone based ones, and thioindigo based ones.

Effective inorganic particles include fine particles of silicon oxides such as silica; various carbonates such as calcium carbonate, magnesium carbonate, and barium carbonate; various sulfates such as calcium sulfate and barium sulfate; various composite oxides such as kaolin and talc; various phosphates such as lithium phosphate, calcium phosphate, and magnesium phosphate; various oxides such as aluminum oxide, titanium oxide, and zirconium oxide; and various salts such as lithium fluoride.

Preferred organic particles other than rubber particles include fine particles of calcium oxalate and terephthalates of calcium, barium, zinc, manganese, and magnesium. Effective crosslinked polymer particles include fine particles of a homopolymer or copolymer produced from vinyl based monomers of divinylbenzene, styrene, acrylic acid, and methacrylic acid. Other preferred ones include fine particles of polytetrafluoroethylene, benzo guanamine resin, thermosetting epoxy resin, unsaturated polyester resin, thermosetting urea resin, and thermosetting phenol resin.

Effective organic lubricants include, for instance, aliphatic hydrocarbon based ones such as liquid paraffin, natural paraffin, synthetic paraffin, and polyethylene; fatty acid-based ones such as stearate, lauryl acid, hydroxystearate, and hardened castor oil; fatty amide based ones such as stearic amide, oleic amide, erucamide, lauric amide, ethylene bisstearic amide, ethylene bisoleic amide, and ethylene bislauric amide; fatty acid metal salts such as aluminum stearate, lead stearate, calcium stearate, and magnesium stearate; ones based on fatty acid (partial) esters of polyhydric alcohol such as glycerin fatty acid ester and sorbitan fatty acid ester; and long-chain fatty acid ester based ones such as stearate butyl ester, montan wax, and other long-chain ester wax. In particular, stearate amide and ethylene bisstearic amide are preferable because they are moderately compatible with polylactic acid and accordingly can be effective in small amounts.

To obtain a polylactic acid-based resin sheet containing polylactic acid and rubber particles, required components may be dissolved and mixed uniformly in a solvent to prepare a solution, followed by removing the solvent to provide a composition. As a practical production method free from steps such as dissolution of raw materials and removal of solvents, however, it is preferable that to adopt a melt-kneading method in which components are melt-kneaded to produce a composition.

There are no specific limitations on the melt-kneading method, and commonly used mixers including kneader, roll mill, Banbury mixer, and uniaxial or twin screw extruder may be used. In particular, it is preferable to use a uniaxial or twin screw extruder from the viewpoint of productivity.

There are no specific limitations on the order of mixing, either. For instance, polylactic acid and rubber particles of a multi-layered polymer may be dry-blended first and then fed to a melt-kneading machine, or a polylactic acid and rubber particles of a multi-layered polymer may be melt-kneaded to prepare a masterbatch, followed by melt-kneading of said master batch and polylactic acid. Or, as needed, other components may be melt-kneaded together, or polylactic acid and other additives may be melt-kneaded first to prepare a masterbatch, followed by melt-kneading of this master batch with the above mentioned rubber-particle-containing masterbatch and polylactic acid.

In the next place, the method to produce the polylactic acid-based resin sheet is described in detail.

Polylactic acid for the invention can be produced by, for instance, a process as follows. A material consisting mainly of L-lactic acid or D-lactic acid as lactic acid components may be used as starting material, and hydroxycarboxylic acid other than said lactic acid components may be used in combination. A cyclic ester intermediate of hydroxycarboxylic acid such as lactide and glycolide may also be used as starting material. Dicarboxylic acids and glycols may also be usable.

Polylactic acid can be produced by direct dehydration and condensation of the starting material, or ring opening polymerization of the cyclic ester intermediate. In the case of direct dehydration and condensation for production, for instance, a high-molecular weight polymer can be produced by performing azeotropic dehydration and condensation of a lactic acid or a mixture of a lactic acid and a hydroxycarboxylic acid preferably in the presence of an organic solvent, particularly a phenyl ether based solvent, or most preferably by removing water from the solvent distilled out from the azeotropic step to provide a virtually water-free solvent, followed by feeding it back to the reaction system for polymerization.

It is also known that a high-molecular weight polymer can be produced also by subjecting a cyclic ester intermediate such as lactide to ring opening polymerization under reduced pressure using a catalyst such as tin octylate. A polymer with a smaller lactide content can be produced by, for instance, the following methods: controlling the conditions for removal of water and low molecule compounds in the organic solvent during heated reflux, deactivating the catalyst after completion of the polymerization reaction to depress depolymerization, and heat-treating the resulting polymer.

The polylactic acid-based resin sheet can be produced by conventional film production methods including T-die casting, inflation, and calendaring, of which the T-die casting method, which uses a T-die to melt-knead and extrude polylactic acid, is preferred. For instance, a typical production process by T-die casting is using a polylactic acid material dried at 60 to 110° C. for 3 hours or more to reduce the moisture content to 400 ppm or less, and melt-kneading it at a cylinder temperature in the range of 150° C. to 240° C., preferably 200° C. to 220° C. to prevent degradation of the polylactic acid. The T-die temperature is preferably controlled in the range of 200° C. to 220° C., and the material extruded from the T-die is cooled on a casting roll at 5 to 50° C. to provide a sheet with a thickness of about 0.1 mm to 1.0 mm. In addition, it is preferable that the resulting sheet is subjected to various surface treatments to improve coating suitability. Available surface treatment methods include corona discharge treatment, plasma treatment, flame treatment, and acid treatment, and any of them can be used effectively, but corona discharge treatment is the most preferable because it can be performed continuously, needs only simple equipment that can be added easily to conventional film production facilities, and can be performed by simple operations.

There are no specific limitations on the method to be used for adding rubber particles and poly(meth)acrylate based resin to a polylactic acid material in carrying out the polylactic acid-based resin sheet production method, but a preferable method is by simultaneous melt-kneading of a masterbatch consisting of polylactic acid and rubber particles with polylactic acid and poly(meth)acrylate based resin. In the masterbatch consisting of polylactic acid and rubber particles, rubber particles preferably account for 10 mass % or more. If the content of rubber particles in masterbatch consisting of polylactic acid and rubber particles is less than 10 mass %, the rubber particles will not disperse adequately in the sheet, and a larger amount of rubber particles will be required to achieve an impact resistance of a practical level, possibly leading to a decrease in the plant-derived content.

In the polylactic acid-based resin sheet, additional layers may be added unless they impair the desired effect. For instance, an adhesion layer or a mold release layer may be provided.

There are no specific limitations on the thickness of the polylactic acid-based resin sheet. The polylactic acid-based resin sheet commonly has a thickness of about 0.1 mm to 1.0 mm. In the case where the polylactic acid-based resin sheet is used as material for containers or blister packs, it is commonly preferable that the sheet has a thickness of about 0.15 mm to 0.7 mm. In the case where the polylactic acid-based resin sheet is used as material for printed products, it is commonly preferable that the sheet has a thickness of about 0.1 mm to 0.4 mm.

Being high in moldability, the polylactic acid-based resin sheet can be processed into molded products. Molded products that can be produced from the polylactic acid-based resin sheet include containers, blister packs, printed products, clear file folders, and clear cases. The polylactic acid-based resin sheet can be printed by a conventional print-processing machine and can be creased in spite of being transparent, and accordingly, it serves preferably to produce clear cases, desktop calendar cases, and blister cases.

EXAMPLES

Our sheets and methods will now be illustrated in detail below with reference to Examples, but it should be understood that this disclosure is not construed as being limited to Examples given below.
[Measurement and Evaluation Method]
Measurements and evaluations made in Examples were carried out under the following conditions.

(1) Thickness of Sheets

The thickness was measured with a microgauge at 10 points aligned in the width direction of a sheet, and the average t (mm) of the thickness measurements was taken as the sheet thickness.

(2) Center Line Average Roughness: Ra

A universal surface profile measuring instrument (SE-3FA, supplied by Kosaka Laboratory Ltd.) was used to measure the two-dimensional center line average roughness (Ra). The measuring conditions were as follows: a stylus end radius of 2 μm, measuring force of 0.7 mN, measuring length of 25 mm, and cut-off of 0.08 mm.

(3) Dynamic Friction Coefficient: μd

Using a slip tester (supplied by Toyo Tester Industry Co. Ltd.) according to JIS-K-7125 (1999), two sheet samples were combined with dissimilar surfaces facing each other, and placed under a weight of 200 g, and after the start of slipping, the resistance in a stable region (μd: dynamic friction coefficient) was determined by the following equation.
Dynamic friction coefficient (μd)=resistance/weight (4) Impact Resistance: Impact Value, Im (N·m/mm)

A film impact tester (supplied by Toyo Seiki Seisaku-sho, Ltd.) was used with a hemispherical impact head with a diameter of ½ inch to measure the impact value in an atmosphere with a temperature of 23° C. and humidity of 65% RH. Film sample's of 100 mm×100 mm were prepared and five measurements were made at each level. Film samples of 100 mm×100 mm were prepared and five measurements were made at each level. The sample thickness was measured with a digital micrometer.

(5) Haze Ha Value (%)

A haze meter (HGM-2DP, supplied by Suga Test Instruments Co., Ltd.) was used according to MS-K-7105 (1981) to measure the haze value. Test was carried out three times at each level, and the three measurements were averaged.

(6) Transparency

Using the haze Ha values determined in (5), evaluations were made according to the following criteria.
○: The resin sheet has a Ha value of 10% or less
x: The resin sheet has a Ha value of more than 10%

(7) Creasability

A sheet sample was creased, and folded back and forth ten times along the crease, and portions along the fold were observed.
○: Free of rupture or cracks along the fold and acceptable
x: Rupture or cracks found along the fold (8) Dispersed State of Rubber Particles
(8-1) Dispersion Diameter A microtome was used to prepare an ultrathin section whose surface gave a cross section of the sheet. Two different points in this ultrathin section was observed at a magnification of ×14,000 using a transmission electron microscope (H-7650, supplied by Hitachi, Ltd.) and a cross-sectional photograph was taken at each point. A 50 mm×50 mm portion was taken arbitrarily in each photograph, and the dispersion diameter was measured for all rubber particles, followed by determining the average dispersion diameter and the maximum dispersion diameter from the dispersion diameter measurements made from each photograph. In carrying out dispersion diameter measurement, those rubber particles (primary particles and agglomerates) that were not completely contained in the arbitrarily-selected 50 mm×50 mm image were not used for the measurement.

Measurements of the major axis of the rubber particles were taken to represent the dispersion diameter. Then, the measurements of dispersion diameter were averaged to provide the average dispersion diameter. The largest one of these measurements of dispersion diameter was taken as the maximum dispersion diameter.

If a 50 mm×50 mm image contains only primary particles, only these primary particles were assumed to be rubber particles in making measurements. If the image contains only agglomerates, then only these agglomerates were assumed to be rubber particles in making measurements. If the image contains both primary particles and agglomerates, both these primary particles and agglomerates were assumed to be rubber particles in making measurements.

(8-2) Number of Particles

A photograph was taken at a magnification of ×14,000 using the transmission electron microscope, and a 50 mm×50 mm portion was arbitrarily selected, followed by determining the value of X/Y from the number of all primary particles (X) and the number of all agglomerates (Y) contained as rubber particles. With respect to the judgment whether particles are agglomerates or not, two or more rubber particles in contact with each other were assumed to form an agglomerate as described previously.

Those rubber particles (primary particles and agglomerates) that were not completely contained in the arbitrarily-selected 50 mm×50 mm image were not used for counting the number of particles.

(9) Appearance of Sheets

The appearance of a sheet was observed visually, and evaluated according to the following criteria.

○: Free from granular structures resulting from coagulation of rubber particles visually identifiable in the sheet x: Granular structures resulting from coagulation of rubber particles visually identified in the sheet

(10) Vicat Softening Temperature

According to JIS-K-7206 B50 method (1999), HDT&VSPT TESTER (S3-FH) supplied by Toyo Seiki Seisaku-sho, Ltd. was used and the temperature at which the measuring needle indenter entered to a depth of 1 mm into a test piece was measured under the conditions of an applied test load of 50±1 N and a heating rate of 50° C./hr. Here, to prepare a test piece, a 80 mm×10 mm×4 mm rectangular parallelepiped of poly(meth)acrylate based resin was prepared according to JIS-K-7152-1 (1999). The temperature of molten resin was 220° C. at the time of test piece preparation.

(11) Layer Thickness Ratio

A cross section of a sheet was photographed in transmitted light using a metallographic microscope (Leica DMLM, supplied Leica Microsystems GmbH) at a magnification of ×100 to determine the thickness of each layer.

(12) Heat Resistance

A test sample of a sheet was prepared, and placed horizontally along the center line 50 mm away from both the upper and the lower heater in a batch-type vacuum molding machine, and both surfaces were heated under the conditions of upper and lower heater temperature settings of 300° C. and a preheat time of 25 seconds. Subsequently, a female die was pressed against the sheet sample and the interior decompressed to produce a molded product in the form of a container with a size of about 9 cm×about 12 cm×about 2.5 cm (height). The resulting molded product was left in a temperature controlled bath set at a predetermined temperature for one hour, and deformation suffered by the molded product was visually observed and evaluated according to the following criteria.

◎: No deformation at 65° C.

○: Deformed at 65° C., but no deformation at 60° C.:

Δ: Deformed at 60° C.

(13) Plant-Derived Conten

The content of polylactic acid (plant-derived content) in the entire sheet was determined from the content of polylactic acid (mass %) in each layer, layer constitution, and thickness ratio, and evaluations were made according to the following criteria.

◎: Plant-derived content is 75% or more.

○: Plant-derived content is 50% or more and less than 75%.

Δ: Plant-derived content is less than 50%.

[Polylactic Acid Used]

(PLA-1):

Poly-L-lactic acid resin (supplied by NatureWorks LLC) with a poly-D-lactic acid content of 5.0 mol %, melting point of 150° C., and mass average molecular weight of 220,000 in terms of PMMA

[Rubber Particle Masterbatch Used]

(CS-1):

Masterbatch based on rubber particles (30 mass % in entire masterbatch) and PLA-1 (70 mass % in entire masterbatch) The rubber particle product used was Metabrane S2001 supplied by Mitsubishi Rayon Co., Ltd. (consisting of core layer of silicone/acrylic polymer and shell layer of methyl methacrylate polymer).

(CS-2):

Masterbatch based on rubber particles (30 mass % in entire masterbatch) and PLA-1 (70 mass % in entire masterbatch) The rubber particle product used was Paraloid BPM500 supplied by Rohm and Haas Japan K.K. (consisting of core layer of butyl acrylate polymer and shell layer of methyl methacrylate polymer).

(CS-3):

Masterbatch based on rubber particles (30 mass % in entire masterbatch) and PLA-1 (70 mass % in entire masterbatch) The rubber particle product used was Paraloid EXL2311 supplied by Rohm and Has Japan K.K. (consisting of core layer of butyl acrylate polymer and shell layer of methyl methacrylate polymer).

(CS-4):

Masterbatch based on rubber particles (50 mass % in entire masterbatch) and PLA-1 (50 mass % in entire masterbatch) The rubber particle product used was Metabrane W-450A supplied by Mitsubishi Rayon Co., Ltd. (polymer consisting of core layer of butyl acrylate polymer and shell layer of methyl methacrylate polymer).

(CS-5):

Masterbatch based on rubber particles (50 mass % in entire masterbatch) and PLA-1 (50 mass % in entire masterbatch) The rubber particle product used was Paraloid BPM500 supplied by Rohm and Haas Japan K.K. (consisting of core layer of butyl acrylate polymer and shell layer of methyl methacrylate polymer).

(A-1):

Masterbatch based on silica (10 mass % in entire masterbatch) and PLA-1 (90 mass % in entire masterbatch)

[Poly(Meth)Acrylate Based Resin of Used]

(PMMA-1):

Polymethyl methacrylate (Sumipex LG21, supplied by Sumitomo Chemical Co., Ltd., Vicat softening temperature 98° C.)

(PMMA-2):

Polymethyl methacrylate (Sumipex LG35, supplied by Sumitomo Chemical Co., Ltd., Vicat softening temperature 89° C.)

(PMMA-3):

Polymethyl methacrylate (Acrypet MF, supplied by Mitsubishi Rayon Co., Ltd., Vicat softening temperature 89° C.)

(PMMA-4):

Polymethyl methacrylate (Delpet 80NH, supplied by Asahi Kasei Chemicals Corporation, Vicat softening temperature 109° C.)
(PMMA-5):
Polymethyl methacrylate (Acrypet VH, supplied by Mitsubishi Rayon Co., Ltd., Vicat softening temperature 107° C.)

Preparation of Polylactic Acid-Based Resin Sheet

Example 1

Polylactic acid (PLA-1) and a rubber particle masterbatch (CS-1) were supplied at a ratio of 90:10 to a vent-type twin screw extruder, melt-kneaded while being deaerated from the vacuum vent portion, extruded from a T-die orifice with an orifice temperature set at 210° C., and discharged between a metallic touch roll with a surface temperature of 40° C. and a metallic casting roll with a surface temperature of 35° C. rotating in the direction of mutual contact so that the material is cooled and solidified after coming in close contact with the casting roll, thereby preparing an unstretched polylactic acid-based resin sheet with a thickness of 0.3 mm. The resulting sheet had good characteristics as shown in Table 1.

Example 2

Polylactic acid (PLA-1) and a rubber particle masterbatch (CS-2) were supplied at a ratio of 85:15 to a vent-type twin screw extruder, melt-kneaded while being deaerated from the vacuum vent portion, extruded from a T-die orifice with an orifice temperature set at 210° C., and discharged between a metallic touch roll with a surface temperature of 50° C. and a metallic casting roll with a surface temperature of 35° C. rotating in the direction of mutual contact so that the material is cooled and solidified after coming in close contact with the casting roll, thereby preparing an unstretched polylactic acid-based resin sheet with a thickness of 0.3 mm. The resulting sheet had good characteristics as shown in Table 1.

Example 3

Polylactic acid (PLA-1) and a rubber particle masterbatch (CS-2) were supplied at a ratio of 80:20 to a vent-type twin screw extruder, melt-kneaded while being deaerated from the vacuum vent portion, extruded from a T-die orifice with an orifice temperature set at 210° C., and discharged between a metallic touch roll with a surface temperature of 50° C. and a metallic casting roll with a surface temperature of 35° C. rotating in the direction of mutual contact so that the material is cooled and solidified after coming in close contact with the casting roll, thereby preparing an unstretched polylactic acid-based resin sheet with a thickness of 0.3 mm. The resulting sheet had good characteristics as shown in Table 1.

Example 4

Polylactic acid (PLA-1) and a rubber particle masterbatch (CS-3) were supplied at a ratio of 90:10 to a vent-type twin screw extruder, melt-kneaded while being deaerated from the vacuum vent portion, extruded from a T-die orifice with an orifice temperature set at 210° C., and discharged between a metallic touch roll with a surface temperature of 50° C. and a metallic casting roll with a surface temperature of 45° C. rotating in the direction of mutual contact so that the material is cooled and solidified after coining in close contact with the casting roll, thereby preparing an unstretched polylactic acid-based resin sheet with a thickness of 0.3 mm. The resulting sheet had good characteristics as shown in Table 1.

Example 5

Polylactic acid (PLA-1) and a rubber particle masterbatch (CS-2) were supplied at a ratio of 85:15 to a vent-type twin screw extruder, melt-kneaded while being deaerated from the vacuum vent portion, extruded from a T-die orifice with an orifice temperature set at 210° C., and discharged between a rubber touch roll with a surface temperature of 50° C. and a metallic casting roll with a surface temperature of 45° C. rotating in the direction of mutual contact so that the material is cooled and solidified after coming in close contact with the casting roll, thereby preparing an unstretched polylactic acid-based resin sheet with a thickness of 0.3 mm. The resulting sheet had good characteristics as shown in Table 1.

Example 6

Polylactic acid (PLA-1) and a rubber particle masterbatch (CS-2) were supplied at a ratio of 70:30 to a vent-type twin screw extruder, melt-kneaded while being deaerated from the vacuum vent portion, extruded from a T-die orifice with an orifice temperature set at 210° C., and discharged between a metallic touch roll with a surface temperature of 50° C. and a metallic casting roll with a surface temperature of 45° C. rotating in the direction of mutual contact so that the material is cooled and solidified after coming in close contact with the casting roll, thereby preparing an unstretched polylactic acid-based resin sheet with a thickness of 0.3 mm. The resulting sheet had good characteristics as shown in Table 1 although it had the highest rubber content among the samples prepared in Examples 1 to 6.

Example 7

The sheet prepared in Example 3 was molded into a clear case. The sample produced was free from fracture or cracks along creases, high in content visibility, and accordingly fully acceptable from the viewpoint of practicality.

Example 8

Polylactic acid (PLA-1) and a rubber particle masterbatch (CS-4) for layer A were supplied at a ratio of 96:4 and polylactic acid (PLA-1) and a rubber particle master batch (CS-4) for layer B was supplied at a ratio of 80:20 to separate vent-type twin screw extruders, melt-kneaded while being deaerated from the vacuum vent portion, extruded from a T-die orifice with an orifice temperature set at 210° C., and discharged between a metallic touch roll with a surface temperature of 40° C. and a metallic casting roll with a surface temperature of 35° C. rotating in the direction of mutual contact so that the material is cooled and solidified after coming in close contact with the casting roll, thereby preparing an unstretched polylactic acid-based resin sheet with a thickness of 0.25 mm. The resulting sheet had good characteristics as shown in Table 1.

Examples 9-18

Except that the polylactic acid, rubber particles master batch, and poly(meth)acrylate based resin constituting each layer as well as the layer constitution and each layer's thickness ratio were as listed in Table 1, the same procedure as in Example 8 was carried out to produce sheets, which were found to have good characteristics.

Comparative Example 1

Polylactic acid (PLA-1) was supplied to a vent-type twin screw extruder, melt-kneaded while being deaerated from the vacuum vent portion, extruded from a T-die orifice with an orifice temperature set at 210° C., and discharged between a metallic touch roll with a surface temperature of 40° C. and a metallic casting roll with a surface temperature of 35° C. rotating in the direction of mutual contact so that the material is cooled and solidified after coming in close contact with the casting roll, thereby preparing an unstretched polylactic acid-based resin sheet with a thickness of 0.3 mm. The resulting sheet was poor in creasability as shown in Table 1.

Comparative Example 2

Polylactic acid (PLA-1) and a rubber particle masterbatch (CS-1) were supplied at a ratio of 90:10 to a vent-type twin screw extruder, melt-kneaded while being deaerated from the vacuum vent portion, extruded from a T-die orifice with an orifice temperature set at 210° C., and discharged between a metallic touch roll with a surface temperature of 50° C. and a metallic casting roll with a surface temperature of 45° C. rotating in the direction of mutual contact so that the material is cooled and solidified after coming in close contact with the casting roll, thereby preparing an unstretched polylactic acid-based resin sheet with a thickness of 0.3 mm. The resulting sheet was poor in sheet appearance as shown in Table 1.

Comparative Example 3

Polylactic acid (PLA-1) and a rubber particle masterbatch (CS-2) were supplied at a ratio of 90:10 to a vent-type twin screw extruder, melt-kneaded while being deaerated from the vacuum vent portion, extruded from a T-die orifice with an orifice temperature set at 210° C., and discharged between a metallic touch roll with a surface temperature of 35° C. and a metallic casting roll with a surface temperature of 40° C. rotating in the direction of mutual contact so that the material is cooled and solidified after coming in close contact with the casting roll, thereby preparing an unstretched polylactic acid-based resin sheet with a thickness of 0.3 mm. The resulting sheet was poor in creasability as shown in Table 1.

Comparative Example 4

Polylactic acid (PLA-1), a rubber particle masterbatch (CS-2), and an inorganic particles master batch (A-1) were supplied at a ratio of 25:15:60 to a vent-type twin screw extruder, melt-kneaded while being deaerated from the vacuum vent portion, extruded from a T-die orifice with an orifice temperature set at 210° C., and discharged between a rubber touch roll with a surface temperature of 40° C. and a metallic casting roll with a surface temperature of 35° C. rotating in the direction of mutual contact so that the material is cooled and solidified after coming in close contact with the casting roll, thereby preparing an unstretched polylactic acid-based resin sheet with a thickness of 0.2 mm. The resulting sheet was poor in transparency as shown in Table 1.

Comparative Example 5

Polylactic acid (PLA-1) and a rubber particle masterbatch (CS-2) were supplied at a ratio of 70:30 to a vent-type twin screw extruder, melt-kneaded while being deaerated from the vacuum vent portion, extruded from a T-die orifice with an orifice temperature set at 210° C., and discharged between a rubber touch roll with a surface temperature of 40° C. and a metallic casting roll with a surface temperature of 50° C. rotating in the direction of mutual contact so that the material is cooled and solidified after coming in close contact with the casting roll, thereby preparing an unstretched polylactic acid-based resin sheet with a thickness of 0.35 mm. The resulting sheet was poor in transparency as shown in Table 1.

Of the sheet samples prepared in Examples 1 to 6 and 8 to 18, those prepared in Examples 11 and 12 were particularly high in transparency, heat resistance, impact resistance, and plant-derived content.

TABLE 1

| | | Example 1 | Example 2 | Example 3 | Example 4 | Example 5 | Example 6 |
|---|---|---|---|---|---|---|---|
| Polylactic acid (mass %) | PLA-1 | 90 | 85 | 80 | 90 | 85 | 70 |
| Rubber particle masterbatch (mass %) | CS-1 | 10 | — | — | — | — | — |
| | CS-2 | — | 15 | 20 | — | 15 | 30 |
| | CS-3 | — | — | — | 10 | — | — |
| Inorganic particle masterbatch (mass %) | A-1 | — | — | — | — | — | — |
| Sheet thickness (mm) | t | 0.30 | 0.30 | 0.30 | 0.30 | 0.30 | 0.30 |
| Center line average roughness (μm) | Ra1 | 0.049 | 0.058 | 0.049 | 0.067 | 0.158 | 0.058 |
| | Ra2 | 0.017 | 0.021 | 0.018 | 0.033 | 0.022 | 0.024 |
| | |Ra1-Ra2| | 0.032 | 0.037 | 0.031 | 0.034 | 0.136 | 0.034 |
| Dynamic friction coefficient | μd | 0.35 | 0.21 | 0.25 | 0.31 | 0.27 | 0.27 |
| Impact value (N · m/mm) | Im | 3.2 | 4.1 | 3.1 | 3.0 | 4.1 | 4.0 |
| Haze (%) | Ha | 5.1 | 6.1 | 4.9 | 9.0 | 7.9 | 8.2 |
| Transparency | — | ○ | ○ | ○ | ○ | ○ | ○ |
| Creasability | — | ○ | ○ | ○ | ○ | ○ | ○ |
| Dispersed state of rubber particles | Average dispersion diameter (μm) | 0.7 | 0.6 | 0.3 | 0.8 | 0.7 | 0.3 |
| | Maximum dispersion diameter (μm) | 0.9 | 1.2 | 1.0 | 1.3 | 1.2 | 0.6 |
| | X/Y (*1) | 0.2 | 0.3 | 0.8 | 0.5 | 0.4 | 4.8 |
| Sheet appearance | — | — | ○ | ○ | ○ | ○ | ○ |

TABLE 1-continued

| | | | | | | | |
|---|---|---|---|---|---|---|---|
| plant-derived content = content of polylactic acid in entire sheet | | (97) | (95.5) | (94) | (97) | (95.5) | (91) |

| | | Comparative example 1 | Comparative example 2 | Comparative example 3 | Comparative example 4 | Comparative example 5 | Comparative example 6 |
|---|---|---|---|---|---|---|---|
| Use of plant-origin material | | ◎ | ◎ | ◎ | ◎ | ◎ | ◎ |
| Polylactic acid (mass %) | PLA-1 | 100 | 90 | 90 | 25 | 70 | |
| Rubber particle masterbatch (mass %) | CS-1 | — | 10 | — | — | — | |
| | CS-2 | — | — | 10 | 15 | 30 | |
| | CS-3 | — | — | — | — | — | |
| Inorganic particle masterbatch (mass %) | A-1 | — | — | — | 60 | — | |
| Sheet thickness (mm) | t | 0.30 | 0.30 | 0.30 | 0.20 | 0.35 | |
| Center line average roughness (μm) | Ra1 | 0.018 | 0.048 | 0.024 | 0.482 | 0.385 | |
| | Ra2 | 0.012 | 0.042 | 0.018 | 0.252 | 0.350 | |
| | |Ra1-Ra2| | 0.006 | 0.006 | 0.006 | 0.230 | 0.035 | |
| Dynamic friction coefficient | μd | 0.40 | 0.57 | 0.61 | 0.11 | 0.35 | |
| Impact value (N·m/mm) | Im | 1.8 | 3.7 | 2.1 | 4.2 | 4.5 | |
| Haze (%) | Ha | 2.1 | 4.6 | 3.3 | 25 | 18 | |
| Transparency | — | ○ | ○ | ○ | X | X | |
| Creasability | — | X | ○ | X | ○ | ○ | |
| Dispersed state of rubber particles | Average dispersion diameter (μm) | — | 1.2 | 0.1 | 0.6 | 0.8 | |
| | Maximum dispersion diameter (μm) | — | 1.8 | 0.4 | 1.1 | 1.2 | |
| | X/Y (*1) | — | 0.2 | 11.5 | 0.4 | 0.6 | |
| Sheet appearance | | — | ○ | X | ○ | ○ | ○ |
| Use of plant-origin material | | ◎ | ◎ | ◎ | ◎ | ◎ | |
| plant-derived content = content of polylactic acid in entire sheet | | (100) | (97) | (97) | (89.5) | (91) | |

| | | | Example 8 | Example 9 | Example 10 | Example 11 | Example 12 | Example 13 |
|---|---|---|---|---|---|---|---|---|
| Layer A | Polylactic acid | Type | PLA-1 | PLA-1 | PLA-1 | PLA-1 | PLA-1 | PLA-1 |
| | | (mass %) | 96 | 96 | 70 | 84 | 84 | 86 |
| | Rubber particle masterbatch | Type | CS-4 | CS-4 | CS-4 | CS-5 | CS-4 | CS-4 |
| | | (mass %) | 4 | 4 | 30 | 12 | 12 | 10 |
| | poly(meth)acrylate based resin | Type | — | — | — | PMMA-5 | PMMA-4 | PMMA-4 |
| | | Vicat softening | — | — | — | 107 | 109 | 109 |
| | | Za (mass %) | 0 | 0 | 0 | 4 | 4 | 4 |
| | Content of rubber particles in layer A | Xa (mass %) | 2 | 2 | 15 | 6 | 6 | 5 |
| Layer B | Polylactic acid | Type | PLA-1 | PLA-1 | PLA-1 | PLA-1 | PLA-1 | PLA-1 |
| | | (mass %) | 80 | 86 | 92 | 36 | 22 | 16 |
| | Rubber particle masterbatch | Type | CS-4 | CS-4 | CS-4 | CS-5 | CS-4 | CS-4 |
| | | (mass %) | 20 | 14 | 8 | 14 | 18 | 14 |
| | poly(meth)acrylate based resin | Type | — | — | — | PMMA-5 | PMMA-4 | PMMA-4 |
| | | Vicat softening | — | — | — | 107 | 109 | 109 |
| | | Zb (mass %) | 0 | 0 | 0 | 50 | 60 | 70 |
| | Content of rubber particles in layer B | Xb (mass %) | 10 | 7 | 4 | 7 | 9 | 7 |
| | Content of polylactic acid in layer B | Yb (mass %) | 90 | 93 | 96 | 43 | 31 | 23 |
| | Yb/Xb | | 90 | 13.3 | 24 | 6.1 | 3.4 | 3.3 |
| | Layer constitution | | B/A/B | B/A/B | B/A/B | B/A/B | B/A/B | B/A/B |
| | Thickness ratio of layers | | 1/8/1 | 2/6/2 | 1/8/1 | 1/8/1 | 1/8/1 | 2/6/2 |
| | Sheet thickness (mm) | t | 0.25 | 0.25 | 0.25 | 0.30 | 0.30 | 0.30 |
| | Center line average roughness (μm) | Ra1 | 0.057 | 0.049 | 0.044 | 0.061 | 0.052 | 0.055 |
| | | Ra2 | 0.021 | 0.024 | 0.019 | 0.035 | 0.022 | 0.033 |
| | | |Ra1-Ra2| | 0.036 | 0.025 | 0.025 | 0.026 | 0.030 | 0.022 |
| | Dynamic friction | μd | 0.28 | 0.31 | 0.28 | 0.32 | 0.38 | 0.41 |
| | Impact value (N·m/mm) | Im | 2.7 | 3.0 | 3.9 | 4.2 | 4.4 | 3.5 |
| | Haze (%) | Ha | 3.0 | 3.5 | 4.1 | 4.0 | 4.2 | 4.8 |
| | Transparency | — | ○ | ○ | ○ | ○ | ○ | ○ |
| | Creasability | — | ○ | ○ | ○ | ○ | ○ | ○ |
| | Heat resistance | — | Δ | Δ | Δ | ◎ | ◎ | ◎ |
| | Dispersed state of rubber particles in layer B | Average dispersion | 0.7 | 0.6 | 0.6 | 0.7 | 0.8 | 0.8 |
| | | Maximum dispersion | 0.8 | 0.9 | 1.1 | 1.1 | 1.2 | 1.3 |
| | | X/Y (*1) | 0.2 | 0.3 | 0.4 | 0.5 | 0.3 | 0.3 |
| | Sheet appearance | | ○ | ○ | ○ | ○ | ○ | ○ |
| | Use of plant-origin material | | ◎ | ◎ | ◎ | ◎ | ◎ | ◎ |

TABLE 1-continued

| | | | | | | | |
|---|---|---|---|---|---|---|---|
| | plant-derived content = content of polylactic acid in entire sheet | | (96.4) | (96) | (87.2) | (80.6) | (78.2) | (63.8) |

| | | | Example 14 | Example 15 | Example 16 | Example 17 | Example 18 |
|---|---|---|---|---|---|---|---|
| Layer A | Polylactic acid | Type | PLA-1 | PLA-1 | PLA-1 | PLA-1 | — |
| | | (mass %) | 26 | 88 | 60 | 90 | 0 |
| | Rubber particle masterbatch | Type | CS-5 | CS-4 | CS-4 | CS-5 | CS-5 |
| | | (mass %) | 24 | 4 | 20 | 4 | 45 |
| | Poly(meth)acrylate based resin | Type | PMMA-1 | PMMA-2 | PMMA-3 | PMMA-4 | PMMA-4 |
| | | Vicat softening | 98 | 89 | 89 | 109 | 109 |
| | | Za (mass %) | 50 | 8 | 20 | 6 | 55 |
| | Content of rubber particles in layer A | Xa (mass %) | 12 | 2 | 10 | 2 | 22.5 |
| Layer B | Polylactic acid | Type | PLA-1 | PLA-1 | — | — | PLA-1 |
| | (mass %) | (mass %) | 26 | 4 | 0 | 0 | 90 |
| | Rubber particle masterbatch | Type | CS-5 | CS-4 | CS-4 | CS-5 | CS-5 |
| | | (mass %) | 24 | 32 | 40 | 45 | 10 |
| | poly(meth)acrylate based resin | Type | PMMA-1 | PMMA-2 | PMMA-3 | PMMA-4 | — |
| | | Vicat softening | 98 | 89 | 89 | 109 | — |
| | | Zb (mass %) | 50 | 64 | 60 | 55 | 0 |
| | Content of rubber particles in layer B | Xb (mass %) | 12 | 16 | 20 | 22.5 | 5 |
| | Content of polylactic acid in layer B | Yb (mass %) | 38 | 20 | 20 | 22.5 | 95 |
| | | Yb/Xb | 3.2 | 1.3 | 1.0 | 1.0 | 19.0 |
| | | Layer constitution | — | B/A/B | B/A/B | B/A/B | B/A/B |
| | | Thickness ratio of layers | — | 1/8/1 | 2/6/2 | 2/6/2 | 1/8/1 |
| Sheet thickness (mm) | | t | 0.25 | 0.25 | 0.25 | 0.25 | 0.25 |
| Center line average roughness (μm) | | Ra1 | 0.051 | 0.057 | 0.048 | 0.045 | 0.039 |
| | | Ra2 | 0.018 | 0.028 | 0.014 | 0.022 | 0.018 |
| | | \|Ra1-Ra2\| | 0.033 | 0.029 | 0.034 | 0.023 | 0.021 |
| Dynamic friction | | μd | 0.28 | 0.26 | 0.22 | 0.27 | 0.22 |
| Impact value (N·m/mm) | | Im | 3.0 | 4.2 | 4.0 | 3.4 | 3.2 |
| Haze (%) | | Ha | 2.8 | 3.5 | 3.8 | 4.1 | 4.6 |
| Transparency | | — | ○ | ○ | ○ | ○ | ○ |
| Creasability | | — | ○ | ○ | ○ | ○ | ○ |
| Heat resistance | | — | ◉ | ○ | ○ | ◉ | ◉ |
| Dispersed state of rubber particles in layer B | Average dispersion | | 0.5 | 0.4 | 0.5 | 0.7 | 0.5 |
| | Maximum dispersion | | 0.9 | 1.0 | 1.3 | 1.1 | 1.1 |
| | X/Y (*1) | | 0.8 | 0.6 | 0.3 | 0.4 | 0.4 |
| | Sheet appearance | | ○ | ○ | ○ | ○ | ○ |
| | Use of plant-origin material | | Δ | ◉ | ○ | ○ | Δ |
| | plant-derived content = content of polylactic acid in entire sheet | | (38) | (76) | (50) | (64.2) | (37) |

*1: Ratio of number of primary particles (X) to that of agglomerates (Y)

The invention claimed is:

1. A polylactic acid-based resin sheet comprising polylactic acid and rubber particles having a ratio X/Y of more than 0 and 1 or less, where X and Y represent a number of primary particles and agglomerates, respectively, and characterized by satisfying (1) to (3):

$$0.01 \text{ μm} \leq |Ra1-Ra2| \leq 0.2 \text{ μm} \quad (1)$$

$$Ra1 \leq 0.3 \text{ μm} \quad (2)$$

$$Ra2 \leq 0.3 \text{ μm} \quad (3)$$

where

Ra1 is a two-dimensional center line average roughness of one surface of the sheet, and Ra2 is a two-dimensional center line average roughness of a surface other than that subjected to measurement of Ra1.

2. The polylactic acid, used resin sheet as claimed in claim 1, wherein an average dispersion diameter of said rubber particles is 0.2 μm or more and 1.0 μm or less, with a maximum dispersion diameter thereof being 0.8 μm or more and 1.5 μm or less.

3. The polylactic acid-based resin sheet as claimed in claim 1 that is unstretched.

4. The polylactic acid-based resin sheet as claimed in claim 1, wherein the rubber particles are formed of a multi-layered polymer.

5. The polylactic acid-based resin sheet as claimed in claim 1 further comprising poly(meth)acrylate based resin.

6. The polylactic acid-based resin sheet as claimed in claim 5, wherein the poly(meth)acrylate based resin has a Vicat softening temperature of 100° C. or more.

7. The polylactic acid-based resin sheet as claimed in claim 1 comprising a layered structure comprising a polylactic-acid-containing layer (layer A) and a polylactic-acid-containing layer (layer B) wherein layer B is at least one of outermost layers of the sheet, and both of (1) and (2) described below are simultaneously met:

$$Xa < Xb, \text{ and} \quad (1)$$

$$Yb/Xb \geq 3. \quad (2)$$

where

Xa is content (mass %) of rubber particles in layer A relative to total components constituting layer A, which accounts for 100 mass %, Xb is content (mass %) of rubber particles in layer B relative to total components constituting layer B, which accounts for 100 mass %, and Yb is content (mass %) of polylactic acid in layer B relative to the total components constituting layer B, which accounts for 100 mass %.

8. The polylactic acid-based resin sheet as claimed in claim 1 comprising a layered constitution comprising a polylactic-acid-containing layer (layer A) and a polylactic-acid-containing layer (layer B) wherein layer B is at least one of outermost layers of the sheet, and (3) is met:

$$Za < Zb \qquad (3)$$

where

Za is a content (mass %) of poly(meth)acrylate based resin in layer A relative to total components constituting layer A, which accounts for 100 mass %, and Zb is a content (mass %) of poly(meth)acrylate based resin in layer B relative to total components constitution layer B, which accounts for 100 mass %.

9. A molded product produced from a polylactic acid-based resin sheet as claimed in claim 1.

10. The polylactic acid-based resin sheet as defined in claim 2, wherein the rubber particles have a ratio X/Y of more than 0 and 1 or less, where X and Y represent a number of primary particles and agglomerates, respectively.

11. The polylactic acid-based resin sheet as claimed in claim 2 that is unstretched.

12. The polylactic acid-based resin sheet as claimed in claim 2, wherein the rubber particles are formed of a multi-layered polymer.

13. The polylactic acid-based resin sheet as claimed in claim 3, wherein the rubber particles are formed of a multi-layered polymer.

14. The polylactic acid-based resin sheet as claimed in claim 2 further comprising poly(meth)acrylate based resin.

15. The polylactic acid-based resin sheet as claimed in claim 3 further comprising poly(meth)acrylate based resin.

16. The polylactic acid-based resin sheet as claimed in claim 4 further comprising poly(meth)acrylate based resin.

* * * * *